Fig. 2B.

INVENTORS
JOHN D. M°GHEE,
ABRAM D. HUEY III,
BY
AGENT

Fig. 5.

INVENTORS
ABRAM D. HUEY III
JOHN D. MCGHEE
ATTORNEY

United States Patent Office 3,459,932
Patented Aug. 5, 1969

3,459,932
CURVE RESOLVER
Abram D. Huey III, East Bradford Township, and John D. McGhee, Plymouth Meeting, Pa., assignors to E. I. du Pont de Nemours and Company, Wilmington, Del., a corporation of Delaware
Filed Oct. 7, 1966, Ser. No. 585,138
Int. Cl. G06f *15/34;* G06g *7/28*
U.S. Cl. 235—197
23 Claims

ABSTRACT OF THE DISCLOSURE

An analog system involving primarily a number of function generating circuits operably coupled to a display tube through diode matrix circuits so that a visible curve trace of variable shape can be generated and matched with an experimental curve plot by using a mirror system to superimpose the images of both and by varying the shape of the curve trace to coincide with that of the experimental plot. Each function generating circuit generates a triangular wave and each diode matrix circuit adjustably varies the slope of that wave at a predetermined breakpoint along the triangular wave. Providing a number of such circuits allows substantially complete resolution of the components of the experimental plot.

---

This invention relates to a system for resolving experimental curves and more specifically to an analog computer system for synthesizing and displaying a multi-component curve envelope and super-imposing it upon an experimental curve.

The instrumentation of modern physical and chemical research methods has led to a presentation of data which is, with increasing frequency, assuming the form of a summation of distribution functions. Such data is encountered in investigations of the distribution of molecules subjected to a force field. Electrophoresis, ultracentrifugation, gas phase and column chromatography, and countercurrent distribution are typical of methods providing data as distribution function summations. Spectroscopy, including ultraviolet, visible, infrared, nuclear magnetic resonance, electron paramagnetic resonance and microwave, represents a field in which the data is exclusively of this kind. Other areas providing distribution data are electron diffraction and statistical analysis.

The parameters governing the shape of these distribution functions or "bands" are of practical interest and of considerable theoretical significance. For example, the mean of an absorption band is related to the energy of transition responsible for the absorption; the area of the band is proportional to the probability of occurrence of that transition. In the event that such bands are well separated and their shape well-defined, these parameters may be easily and unambiguously estimated; however, this condition is a relative rarity. The majority of spectra consists of several bands which are poorly resolved.

There are essentially three methods for determining the band parameters of poorly resolved distribution function summations. The first involves the very tedious procedure of laborious hand computations and plottings by a trial and error method. Due to the inordinate amount of time and effort necessarily expended to accomplish such a task, it is improbable that this method would find application to the resolution of distribution functions on a large scale. The second method involves the use of digital computer techniques. The use of the digital computer for resolution of the bands has not become widespread because of certain complexities inherent in either a Fourier transform or least squares approach to the problem. The third method, the subject of this invention, applies analog computer techniques to the solution of the problem. In this resolution method a multi-component curve is generated, visibly displayed, and matched with an experimental curve. The curve is then broken down into its components from which the component parameters can be measured.

Therefore, it is an object of this invention to provide an analog system capable of synthesizing a visible curve trace representating a curve envelope comprising a single component distribution function or a summation of distribution functions. It is a further object to provide within the analog system the capability of displaying the synthesized curve trace as an overlapping curve envelope or as an individual distribution function, and to provide the analog system with the additional capability for superimposing the synthesized curve trace upon any given experimental curve plot, thereby allowing resolution of the experimental curve.

Another object is to provide improved function generating circuitry to synthesize a smooth, continuous, linearly-displayed curve trace.

Various other objects and advantages will appear from the following description of an embodiment of the invention, and the novel features will be particularly pointed out hereinafter in connection with the appended claims.

The system comprises a first circuit means having a synchronizing input circuit means and first and second output circuits. The first circuit means produces a ramp signal in the first and second output circuits, which is synchronized with line power input by the synchronizing input circuit means. A cathode ray display tube means, including a horizontal and a vertical deflection circuit means, for converting electrical input signals into a visible curve trace, is electrically coupled to the first output circuit of said first circuit means through the horizontal deflection circuit means.

Plural function generating means each have a square wave generating circuit means electrically coupled to an electrical integrating circuit means to produce a square wave signal and convert it to a triangular wave signal. Each function generating means has an input circuit which is electrically coupled between the second output circuit of the first circuit means and the square wave generating means. Plural diode matrix circuit means are electrically coupled to the integrating circuit means of each of the plural function generating means. The diode matrix circuit means adjustably varies the slope of the triangular wave signal at predetermined breakpoints along the triangular wave. Each function generating means additionally has an output circuit electrically coupled between the diode matrix circuit means and the vertical deflection circuit means of the cathode ray display tube means.

The above description can be more readily understood by a reading of the following specification and the accompanying drawings, wherein:

FIGURES 2A, 2B and 2C are partially detailed schematic diagrams of the curve resolver; FIGURE 2A shows the power deck and optical system; FIGURE 2B illustrates the control chasis of the curve resolver; FIGURE 2C diagrams one of the plural function generating means, listed as Channel #1.

Figure 1:
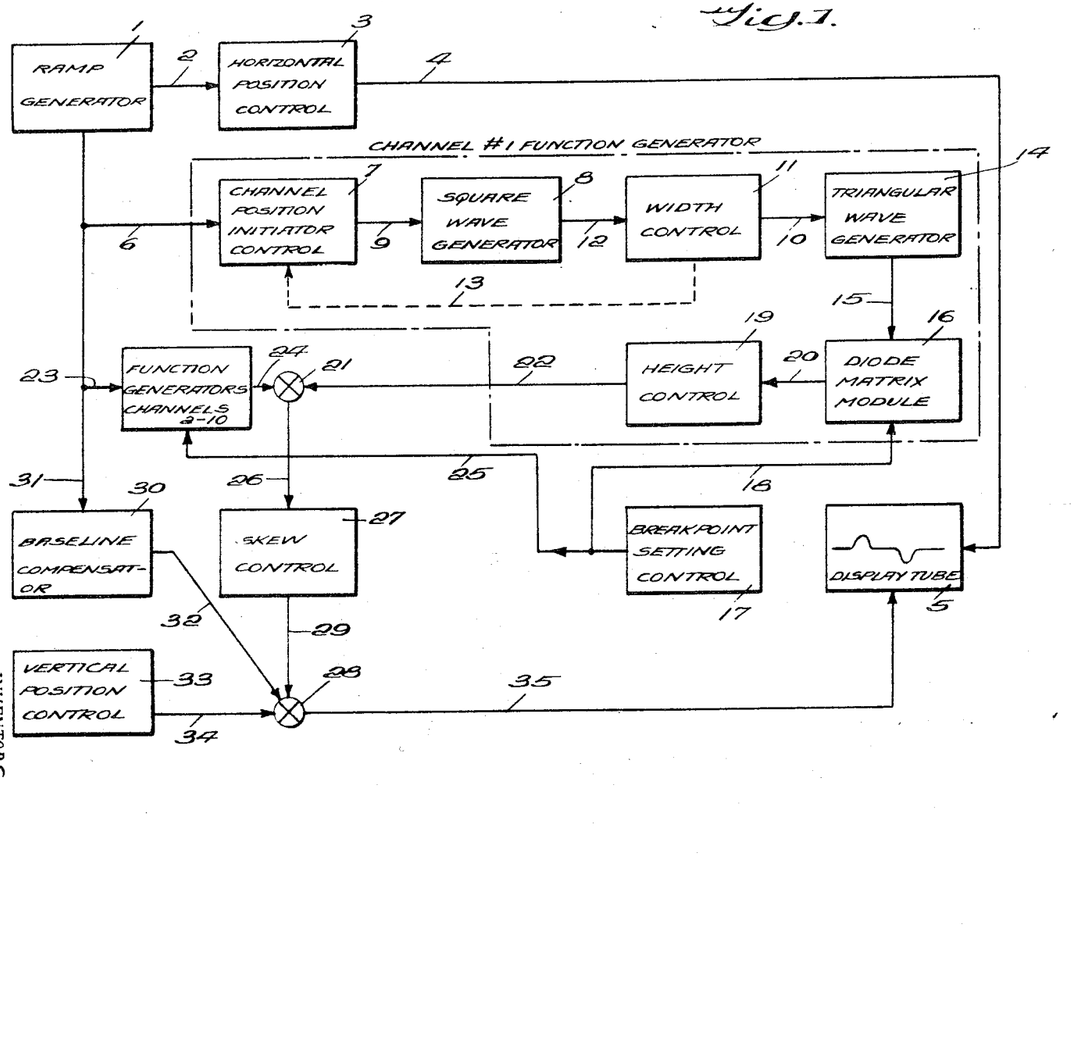
FIGURE 1 is a schematic block diagram of the curve resolver system.

To more fully understand the basic concept of this invention, refer to the schematic block diagram of FIGURE 1. The basic waveform utilized for the instant invention is the ramp or "saw-tooth" function. A D.C.

power supply (not shown) feeds ramp generator 1. A ramp signal from ramp generator 1 is conducted through conductor 2 into horizontal position control 3. Horizontal position control 3 provides means through conductor 4 for adjusting the horizontal position of the curve trace as seen on display tube 5.

Another ramp signal is fed through conductor 6 into channel position initiator control 7 of the function generator designated as Channel #1. Channel position initiator control 7 regulates the time or X-axis position of the entering ramp signal thereby fixing the horizontal position of the Channel No. 1 curve trace on the display tube. The signal from channel position initiator control 7 actuates square wave generator 8 through conductor 9. The width of the square wave signal traversing conductor 10 is controlled by width control 11, coupled to the square wave generator by conductor 12. Additionally, width control 11 is operably coupled by feedback conductor 13 to channel position initiator control 7 so that a mechanical adjustment of the width control produces a corresponding change in the horizontal position of the square wave thus fixing the center point of the resulting curve trace. The square wave signal traversing conductor 10 is integrated to form a triangular wave signal by triangular wave generator 14. The slope of the triangular wave signal passing through conductor 15 is varied subsequently by diode matrix module 16 at breakpoints predetermined by breakpoint setting control 17 coupled through conductor 18. The triangular wave signal is thus converted into a smooth waveform corresponding to a Guassian or Lorentzian distribution function, or a modification thereof. The height of the distribution function is mechanically varied by height control 19 coupled to diode matrix module 16 by conductor 20. The signal from height control 19 is coupled to summation point 21 through conductor 22.

Conductor 23, in common with conductor 6, transmits, collaterally, the ramp signal issuing from ramp generator 1 to a plurality of function generator channels. The number of additional channels employed in the circuit is not critical, but depends upon the experimental curve being resolved. The present embodiment contains a total of 10 function generator channels. The signals from channels two through ten are electrically coupled via conductor 24 to summation point 21. Additionally, breakpoint set control 17, which provides mechanical adjustment of the breakpoints of the triangular wave signal, is coupled through conductor 25 to channels two through ten. By employing a single breakpoint set circuit, as herein described, a uniformity between distribution functions is obtained.

Summation point 21 serves as a collection and addition point for the distribution function waveforms emanating from channels one through ten. The number of channels which are employed in any given curve resolution is contingent upon the number of peaks or "bands" comprising the experimental curve.

The combined signal from summation point 21 is fed via conductor 26 into skew control 27 which is electrically coupled to summation point 28 by means of conductor 29. The skew control gives the adaptability, if desired, of exponentially skewing a given curve to duplicate "tailing," commonly encountered in experimental curves.

Baseline compensator 30 is coupled to ramp generator 1 by means of conductor 31 and subsequently to summation point 28 via conductor 32. The baseline can thereby be adjusted to any desired deviation from horizontal to allow resolution of experimental curves having sloping or irregular baselines.

The vertical position of the curve envelope is potentiometrically regulated by vertical position control 33 coupled through conductor 34 to summation point 28. The signal from summation point 28 is then fed into display tube 5 by conductor 35.

The final result is to produce a curve constituting a predetermined distribution function or an overlapping curve envelope (a summation of distribution functions). Any distribution function can be generated, whether it be Guassian, Lorentzian or a modification of either. Through an operator's manipulation of the various controls, the height and width and horizontal position of each distribution function can be independently varied. In addition, the curve envelope may be positioned horizontally or vertically on the display tube 5.

Figure 2A:
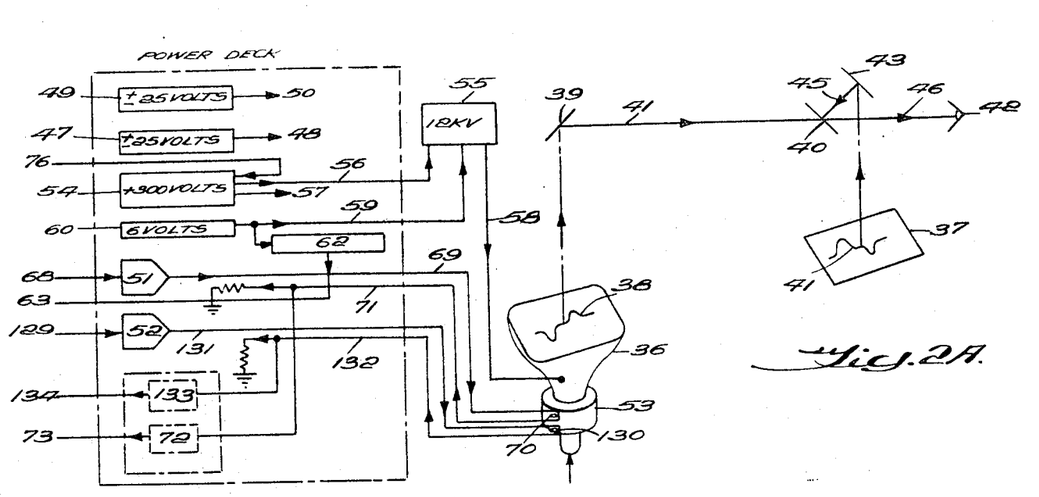
Figure 2B:
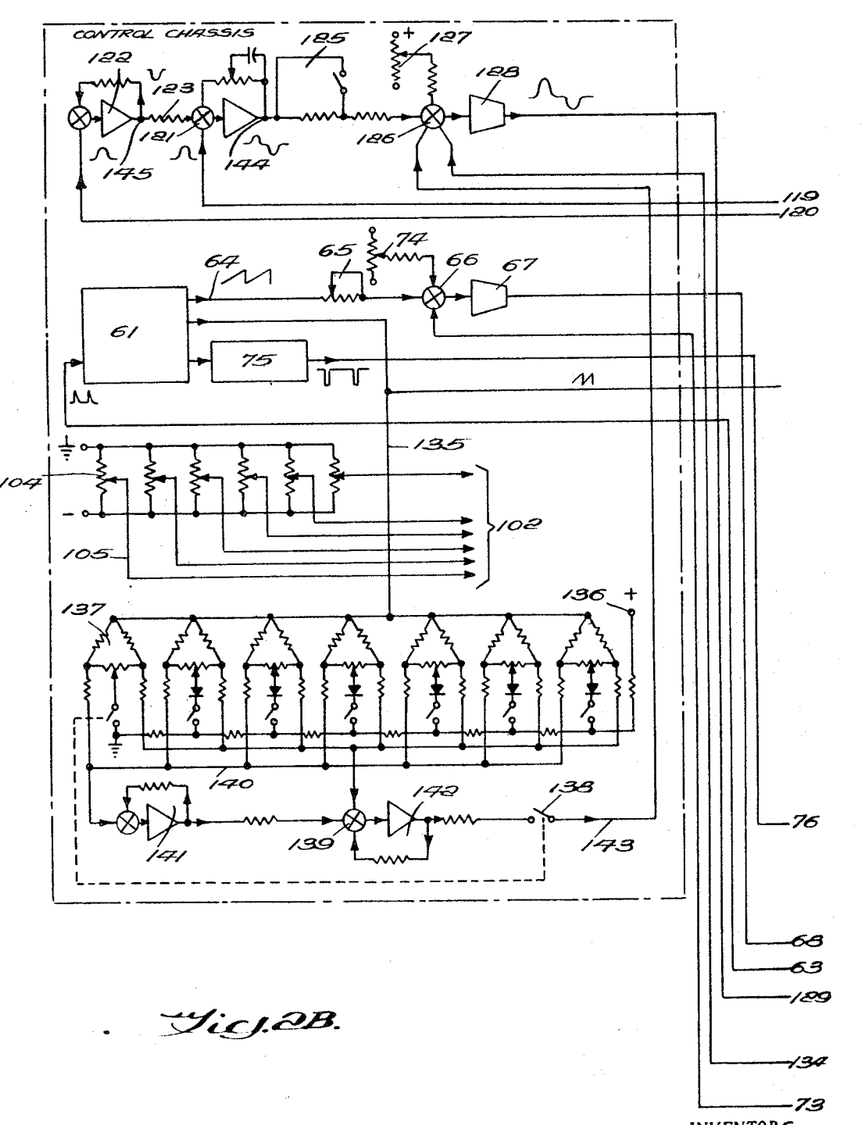
Figure 2C:
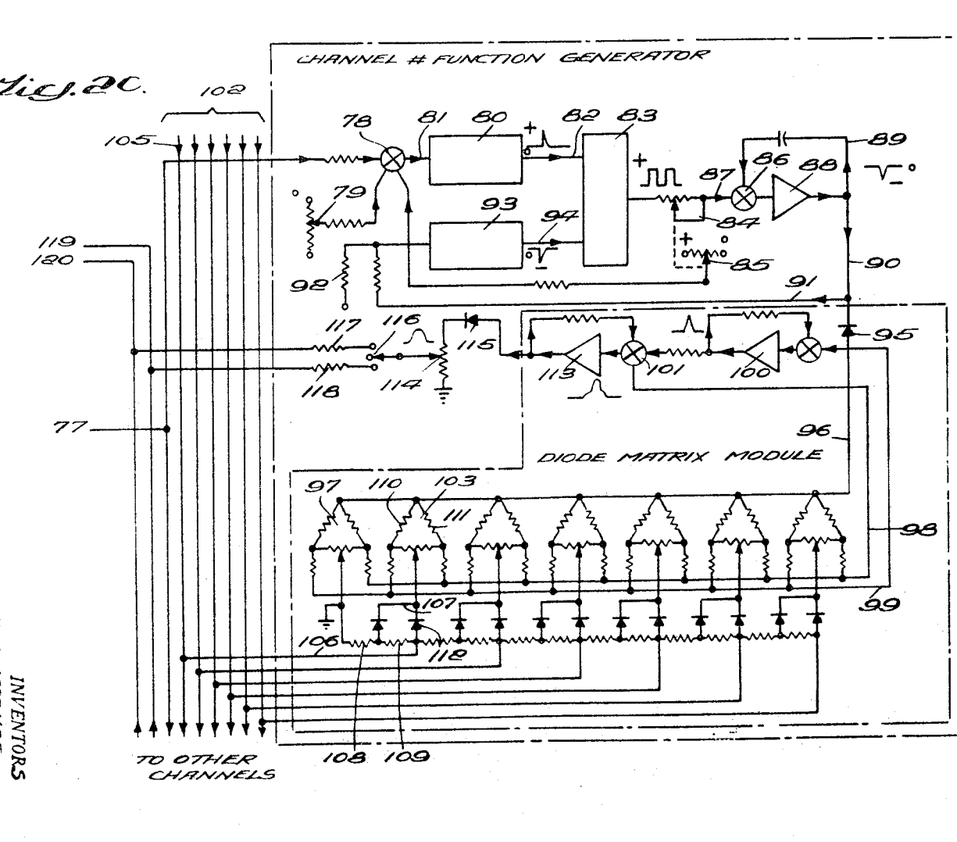
Figure 3:
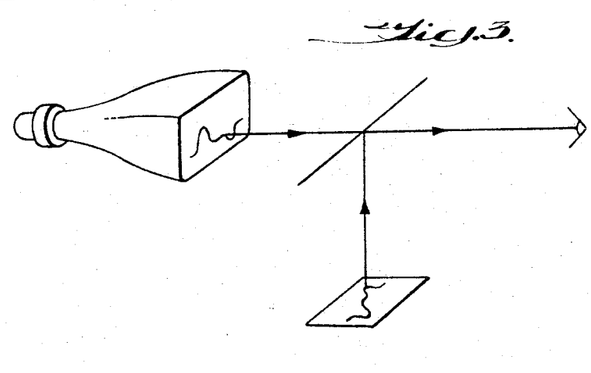
FIGURE 3 and FIGURE 4 are alternative optical systems which can be utilized in conjunction with the circuitry of the curve resolver and the cathode ray display tube.
Figure 4:
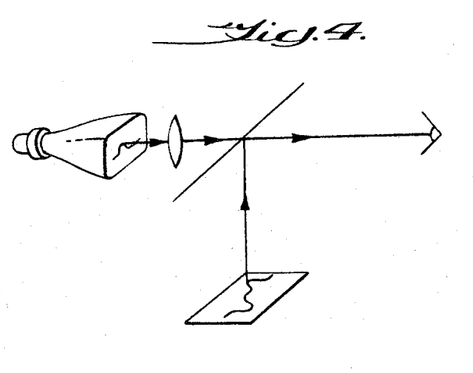

A more detailed explanation of the circuitry and optical system used with the curve resolver will follow in conjunction with the description of FIGURES 2A, 2B and 2C. In the following description of the optical system, it will be assumed that the desired visible curve trace has been generated and is displayed on display tube 36 of FIGURE 2A.

Referring to FIGURE 2A, experimental curve plot 37 to be resolved is placed on a panel of the cabinet housing the circuitry and optical system of the curve resolver. Contained within the cabinet is display tube 36 having thereon visible curve trace 38. Display tube 36 can be a small oscilliscope or a television tube suitable modified for the curve resolver. A first front surface mirror 39 is placed in operable relationship to visible curve trace 38 such that the curve trace is reflected therefrom. Semi-transparent mirror 40 is positioned to intersect reflected curve trace beam 41. A portion of reflected curve trace beam 41 passes through the semi-transparent mirror and reaches observation point 42. A second front surface mirror 43 is positioned in relation to experimental curve plot 37 such that experimental curve 44 is reflected therefrom. Additionally, semi-transparent mirror 40 is positioned at a suitable angle so that a portion of reflected curve plot beam 45 is again reflected from semi-transparent mirror 40. The angle of semi-transparent mirror 40 must also be such that the portion of reflected curve plot beam 45 which is reflected from semi-transparent mirror 40 coincides with the portion of reflected curve trace beam 41 which passes through semi-transparent mirror 40. Two coinciding beams 46 make it appear from the observation point that experimental curve 44 and visible curve trace 38 are superimposed in the plane of the semi-transparent mirror. To overcome parallax, mirrors 39, 40 and 43 are placed in relation to display tube 36 and experimental curve plot 37 so that the optical path of the curve trace beam is substantially equal to the optical path of the curve plot beam.

The power deck of the curve resolver, shown in FIGURE 2A, contains the several power supply circuits for all circuit modules. Regulated plus and minus 25-volt supply 47 transmits power to all modules through condutor 48. Power connections to the modules are not shown. Unregulated plus and minus 25-volt supply 49 powers, via conductor 50, the final drive amplifiers 51 and 52 for deflection yoke 53 of display tube 36. Regulated plus 300-volt source 54 supplies 12 kilovolt supply 55 through conductor 56. The plus 300-volt source is regulated for line variations, thereby immunizing 12 kilovolt supply 55 from line disturbances. Display tube 36 is powered through coupling 57 by plus 300-volt source 54. Filament power is supplied to display tube 36 through conductor 58 from 12 kilovolt supply 55; however, the 12 kilovolt supply is additionally powered through conductor 59 by 6-volt filament supply 60. The exact value of the 6-volt filament supply in not critical.

The remainder of the circuitry in FIGURE 2A will be explained in conjunction with the description of FIGURES 2B and 2C.

A further understanding of the circuitry employed in the curve resolver continues with FIGURE 2B. Ramp generator 61 is powered by line voltage and synchronized by synchronizing circuit 62 (FIGURE 2A) through conductor 63. Synchronizing circuit 62 is synchronized by 6-volt filament supply 60 (FIGURE 2A). The ramp generator is designed to provide a linear ramp signal having low impedance.

A positive to negative linear ramp signal is forwarded from ramp generator 61 through conductor 64 to horizontal width control resistor 65, and subsequently to electrical summing point 66. The ramp signal is fed from summing point 66 to horizontal pre-amplifier 67. The amplified signal is conducted through conductor E to final horizontal amplifier 51 (FIGURE 2A), where the linear ramp signal is finally amplified before transmission through conductor 69 to horizontal deflection coils 70 of display tube 36. Feedback from horizontal deflection coils 70 is fed through conductor 71 to horizontal linearizing circuit 72. As the horizontal trace moves from the center of display tube 36 the deflection per increment of current becomes non-linear. This non-linearity is corrected by horizontal linearizing circuit 72. Additionally this horizontal linearizing circuit is maintained at a fixed temperature to prevent drift. The signal therefrom is conducted through conductor 73 back to summing point 66 where the width-adjusted ramp signal is electrically added thereto. In addition, a mechanically adjustable D.C. bias voltage is introduced to summing point 66 from horizontal position control 74. The D.C. bias voltage when added to the ramp signal and feedback signal allows the horizontal position of curve trace 38 to be mechanically varied.

Ramp generator 61 also supplies a ramp signal to retrace blanking circuit 75 which is coupled by conductor 76 to plus 300 volt source 54. Blanking circuit 75 eliminates retrace on display tube 36 as ramp generator 61 resets to supply another ramp signal.

A positive ramp signal from ramp generator 61 is fed to the function generator (FIGURE 2C) via conductor 77. As will be observed, only one channel or curve generator is illustrated in FIGURE 2C. To provide the desired summation of distribution functions any given number of channels can be employed in the curve resolver. However, since most experimental curves contain ten or less single peaks, the number of channels utilized in this embodiment is ten. There is, however, no limit as to the number of channels which can be used and no limitation should be implied by the restriction of the instant embodiment.

Conductor 77 supplies the ramp signal through a resistor to summation point 78. Conductor 77 also supplies, collaterally, the remainder of the curve generating channels with the ramp signal. A negative D.C. bias is also fed into summing point 78 from position control 79. This presets the desired horizontal position of the curve generated by channel one on display tube 36. The signal from summing point 78 is conducted to zero crossover plus pulse generator 80 through conductor 81. When the current from ramp generator 61 is opposite in value and equal in magnitude to the current from position control 79, zero crossover plus pulse generator 80 supplies a plus pulse through conductor 82 to square wave generator 83, causing the square wave generator voltage to go from negative to positive. The output of square wave generator 83 is subsequently fed through adjustable resistor 84 for controlling the width of the square wave signal output. When width control 84 is mechanically adjusted, positive bias current control 85 is also varied, supplying summing point 78 with a positive bias. The purpose of positive bias control 85 is to compensate for a shift in the center of the peak of the curve trace resulting from channel one when the width is varied. The positive bias control supplies a corrective amount of current to summation point 78 to initiate the square wave earlier in time when the width of the wave is made greater by adjustment of width control 84. Conversely, when the width of the square wave is decreased, the current supplied by control 85 causes an initiation of the square wave at a point later in time.

The adjusted square wave signal is transmitted to summing point 86 of the triangular wave generator (electrical integrating circuit) via conductor 87. The triangular wave generator is an analog device comprising operational amplifier 88 and capacitive feedback 89 coupled across operational amplifier 88 between summing point 86 and output conductor 90. An integration of the positive portion of the square wave signal by the triangular wave generator produces the negative leading edge of a triangular wave signal in conductor 90. When the negative value of the triangular wave voltage in conductor 91 exceeds in magnitude the positive bias, determined by bias control 92, zero crossover negative pulse generator 93 turns on, producing a sharp negative pulse in conductor 94. This negative pulse resets square wave generator 83 to a negative voltage. Subsequent integration by the triangular wave generator forms the trailing edge of the triangular wave signal. The negative triangular wave is prevented from going positive by having the collector of operational amplifier 88 coupled through a resistor to zero voltage.

The completed negative triangular wave signal now enters the diode matrix module through rectifying diode 95 by means of conductor 96. As the voltage of the triangular wave signal goes from zero the two branches of voltage dividing circuit 97 start to conduct since the wiper of the potentiometer is at ground. The current flowing out each branch of voltage dividing circuit 97 by means of conductors 98 and 99 is adjusted by the setting of the wiper of the potentiometer. If the wiper is set at the center of the potentiometer, by utilizing equal resistors, the voltage of conductor 98 will be the same as that of conductor 99. By passing the current from conductor 99 into 1:1 inverting amplifier 100, the resulting voltage is inverted thereby resulting in a zero voltage at summing point 101. Therefore, it is readily apparent that by setting the potentiometer at various positions the slope of the first segment of the curve trace can be fixed at positive, negative or zero slopes. Initially, only voltage dividing circuit 97 will conduct since the wipers of the potentiometers of the remaining voltage dividing circuits are negatively biased by the breakpoint pots (FIGURE 2B) through conductors 102. (All channels have the same breakpoints via common conductors 102.) However, as the voltage becomes increasingly negative, voltage dividing circuit 103 starts to conduct. The voltage at which it conducts, forming a second breakpoint, is determined by breakpoint pot 104 (FIGURE 2B) via conductors 105 and 106. Like voltage dividing circuit 97, voltage dividing circuit 103 can create a waveform having a positive, negative or zero slope at the second breakpoint. By sequentially setting the remaining breakpoint pots (FIGURE 2B), the breakpoints of the remaining voltage dividing circuits are fixed at the value that the bends are to occur. The amount of bending is then adjusted by fixing the potentiometers of the remaining voltage dividing circuits. The incorporated diodes are used as rectifiers to insure unidirectional current flow. As the negative triangular wave signal rises the diode matrix produces a curve having seven breakpoints along the leading edge. Similarly, the falling wave results in seven breakpoints on the trailing edge.

To provide a more accurate resolution, six additional diode circuits are added giving double breakpoints and, necessarily, a smoother curve. The circuit adds the double breakpoint as follows, taking diode circuit 107 and resistors 108 and 109 as a representative example. As the voltage goes negative the current out the branches necessarily, a smoother curve. The circuit adds the voltage of diode circuit 107 starts to conduct. The voltage where this starts to conduct is determined by voltage divider resistors 108 and 109. In this embodiment the resistance of resistor 108 in parallel with resistor 109 is made equal to resistor 110 and half the potentiometer of voltage dividing circuit 103 in parallel with resistor 111 and the other half of the potentiometer. The values, being equal, mean that the current change through the wiper of potentiometer per change of voltage into the diode matrix circuit will be half of what it will be after the voltage causes diode circuit 112 to conduct. This permits the curve bending 50% as diode circuit 107 conducts and the remaining 50% as diode circuit 112 conducts. The amount and direction of bending is determined by the potentiometer of voltage dividing circuit 103 as in the single breakpoint unit. It will be noted that voltage divider resistors 108 and 109 are not set at 50% of the voltage between the wipers of voltage dividing circuits 97 and 103 since conduction by diode circuit 107 incurs a load at the wiper of voltage dividing circuit 103 causing the voltage change at this point to then change at only 50% of the rate it had been changing. Therefore, as the horizontal sweep travels on a time basis, to make the additional bend half-way between the two original breakpoints, the uneven values for resistors 108 and 109 are necessary. The other resistors and diodes perform the same function between the original breakpoints, thus, giving a total of 26 segments in the full curve instead of the original 14. This action could be carried on to give any desired number of bends between the original breakpoints by adding more resistors and diodes. The source resistances and voltages, however, must be adjusted to give the proper timing and proportional bend. The negative synthesized curve at summing point 101 is fed through inverting operational amplifier 113, having a resistive feedback to summing point 101, to height control 114 via rectifying diode 115. By varying the voltage position of the wiper of height control 114 the amplitude of the subsequent curve trace can be regulated.

Since curve envelopes can include both positive and negative distribution functions, an inverting circuit (FIGURE 2B) comprising inverting switch 116, conductors 117, 118, 119 and 120, summing point 121 and operational amplifier 122 is electrically coupled to height control 114. Collaterally, the other nine channels are coupled to conductors 119 and 120 through their respective inverting switches. When inverting switch 116 is at the middle position, channel one is turned off. To form a normal positive curve trace, the inverting switch is placed in the upper position providing an electrical path through conductors 117 and 120 into operational amplifier 122 having a resistive feedback. The signal is then transmitted to summing point 121 via resistive path 123. If, however, an inverted negative curve trace function is desired, inverting switch 116 must form a conductive path via conductors 118 and 119 to summing point 121.

Tailing or skewing, commonly found in experimental curve plots, is duplicated by exponential decay in skew adjustment 124, entailing an operational amplifier and a capacitive-resistive feedback, electrically coupled to summing point 121.

The signal from skew adjustment 124 represents a summation of signals from channels one through ten. The composite signal now passed through 2:1 gain control 125, which provides a 2:1 amplitude variation by shorting across a resistor, to summing point 126. Vertical position control 127 coupled to summing point 126 adds a variable positive or negative voltage at the summing point thereby allowing adjustment of the vertical position of visible curve trace 38.

Summing point 126 is electrically coupled to vertical pre-amplifier 128 and thereafter, via conductor 129, to vertical final drive amplifier 52 (FIGURE 2A). This final drive amplifier drives vertical deflection coils 130 through conductor 131. Conductor 132 transmits the feedback signal from the vertical deflection coils to vertical linearizing circuit 133, which is analogous to aforementioned horizontal linearizing circuit 72. The conductive path from vertical linearizing circuit 133 back to summing point 126 is provided by conductor 134.

The baseline compensator (FIGURE 2B) is utilized to allow resolution of experimental curves having sloping or irregular baselines. The zero to positive ramp signal fed to channels one through ten is introduced into the baseline compensator via conductor 135. The voltage dividing circuits of the baseline compensator are analogous to those of the diode matrix module (FIGURE 2C).

A major difference, however, is that the wipers of the voltage dividing circuits of the baseline compensator are connected across switches to fixed voltages, supplied by a series of fixed resistors extending from positive voltage source 136 to zero volts at the wiper of voltage dividing circuit 137. Thus, we note, the breakpoints created by the seven voltage dividing circuits, employed in the embodiment, are fixed while the slopes are variably controlled by mechanical adjustment of the potentiometers. Each or all of the voltage dividing circuits may be turned on or off depending on the desired baseline shape by the switches on the wipers or by switch 138. The resulting differential voltages are then subtracted at summing point 139 subsequent to inversion of the voltage in conductor 140 by operational amplifier 141. The negative baseline curve at summing point 139 is inverted by operational amplifier 142 and added to the final curve trace signal at summing point 126 via conductor 143.

There are two essential accessories for the disclosed curve resolver. The first is an integration meter. In actual operation, this meter is set at 100% with all channels turned on and at 0% for the baseline. Then each channel which is a part of the solution can be turned on independently yielding the relative area of each distribution function. The particular meter utilized in this embodiment is a current averaging device; however, any type of meter which will perform the same function can be incorporated. The integration meter, in this embodiment, is electrically connected at summing point 144 and summation point 145 thereby allowing integration of both normal and inverted curves.

The second integral accessory is a curve plotter. The plotter enables the operator to record his solution to a given envelope. The plotter will record anything which is displayed on the display tube with the exception of the baseline compensation. In order to trace the solution to a curve such as the nylon X-ray diffraction, the operator would sweep through four times. The first sweep would record the curve envelope and then one sweep through would record each of the three channels necessary for the solution. The recorder can be made to reproduce a 1:1 plot within the limits of the recorder chart paper. The curve plotter accessory, in this embodiment, is electrically coupled to conductor 64 to provide horizontal sweep and to summation point 144 for providing the vertical position to the curve plotter.

Figure 5:
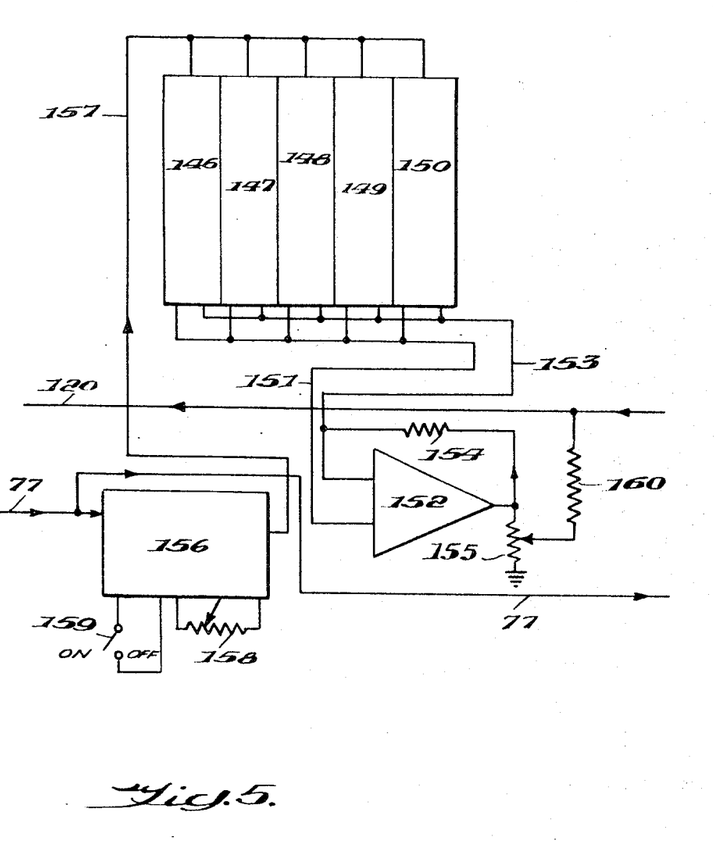
FIGURE 5 is a block diagram of a tandem channel unit which can be incorporated in the curve resolver.

Another accessory of collateral interest is the tandem channel unit, illustrated in FIGURE 5, which provides a means of shifting the horizontal positions and vertical heights of distribution functions from a plurality of tandem channels with single position and single height controls. This permits formation and adjustment of an overall curve envelope without destroying the proportionality of the individual distribution functions with respect to height and position. In FIGURE 5, a plurality of function generators 146, 147, 148, 149 and 150, comprising a single tandem channel, are commonly connected through the normal position of their respective inverting switches 116 (FIG. 2C) via conductor 151 to one input of differential amplifier 152 and through the inverting position of their respective inverting switches 116 via conductor 153 to the other input of differential amplifier 152. Each of the function generators is of the type illustrated in FIGURE 2C. Differential amplifier 152 provides an output equal to the difference between the normal and invert inputs. The output of the amplifier is stabilized by feedback through a high resistance, resistor 154. The aforementioned common height control is provided by variable resistor 155 coupled between the output of amplifier 152 and conductor 120 through fixed resistor 160. Conductor 120 as shown in FIGURE 2B feeds the input of amplifier 122. When the tandem channel unit is employed, conductor 119 (FIGURE 2B) is omitted. The common horizontal position adjustment for the illustrated tandem channel unit is provided by position control 156 having its input coupled to conductor 77 (FIG. 2C) and its output commonly connected to summing points 78 of the respective function generators 146, 147, 148, 149 and 150 via conductor 157. Through adjustment of variable resistor 158, position control 156 adds a bias to the horizontal ramp signal issuing from ramp generator 61 such that the horizontal positions of the individual distribution functions of the function generators can commonly be shifted as desired. Position control 156 can be turned on or off by switch 159 as indicated. Other channels are connected in the same manner as described above, with the inputs to their respective position controls 156 coupled to conductor 77 and the outputs from their respective height controls through variable resistor 155, coupled to conductor 120 through resistor 160. Obviously, a tandem channel unit can include any number of tandem channels, each having any desired number of function generators. The tandem channel unit finds utility, for example, in matching paint pigment colors where each tandem channel unit represents a single pigment spectral response curve.

It will be understood that various changes in the details, materials, steps and arrangement of parts, which have been herein described and illustrated in order to explain the nature of the invention, may be made by those skilled in the art within the principle and scope of the invention as expressed in the appended claims.

We claim:

1. A system including power input circuitry for producing a visible curve trace having a preselected baseline and curve shape, and matching said visible curve trace with an experimental curve plot comprising:
    a first circuit means having a synchronizing input circuit means and first and second output circuits, said synchronizing input circuit means adapted to produce a ramp signal synchronized with line power input in each of said first and second output circuits,
    a display means including a cathode ray display tube means having horizontal and vertical deflection circuit means for converting electrical input signals into a variable curve trace, said horizontal deflection circuit means electrically coupled to said first output circuit of said first circuit means,
    plural function generating means each having square wave generating circuit means, an electrical integrating circuit means electrically coupled to said square wave generating circuit means, said electrical integrating circuit means producing a triangular wave signal, a diode matrix circuit means electrically coupled to said electrical integrating circuit means for adjustably varying the slope of said triangular wave signal at predetermined breakpoints along said triangular wave signal, said plural function generating means each having an input circuit electrically coupled between said second output circuit of said first circuit means and said square wave generating circuit means, and an output circuit electrically coupled between said diode matrix circuit means and said vertical deflection circuit means of said cathode ray display tube means.

2. The system of claim 1 further comprising:
    a second circuit means, having input and output circuits, for electrically bending the baseline of said visible curve trace at preselected intervals, said inputs circuit of said second circuit means electrically coupled to said second output circuit of said first circuit means, said output circuit of said second circuit means electrically coupled to said vertical deflection circuit means of said cathode ray display tube means.

3. The system of claim 1 wherein said diode matrix circuit means comprises:
    an additional diode means for electrically creating additional breakpoints intermediate to said predetermined breakpoints transforming the slope of said triangular wave signal into a plurality of increments, said additional diode means electrically coupled to said diode matrix circuit means.

4. The system of claim 1 wherein said diode matrix circuit means comprises:
    a plurality of adjustable voltage dividing circuits having a common input circuit and two common output circuits, said input circuit electrically coupled to the output of said electrical integrating circuit means, the center of one of said plurality of adjustable voltage dividing circuits electrically coupled to ground, the centers of the other said plurality of adjustable voltage dividing circuits electrically coupled to adjustably biased diode circuits,
    a first inverting amplifier circuit having input and output circuits, and
    a second inverting amplifier circuit having input and output circuits, said first and second inverting amplifier circuits electrically coupled in series relationship between the output of said first inverting amplifier circuit and the input of said second inverting amplifier circuit, one of the said two common output circuits of said plurality of voltage dividing circuits electrically coupled to said input of said first inverting amplifier circuit, the other of said two common output circuits of said adjustable voltage dividing means electrically coupled to a summing point between said first and said second inverting amplifier circuits.

5. The system of claim 4 wherein the diode matrix circuit means further comprises:
    additional diode circuits electrically coupled in parallel relationship to each of said adjustably biased diode circuits.

6. The system of claim 1 further comprising:
    an additional circuit means for compensating for nonlinearity of said visible curve trace of said cathode ray display tube means.

7. The system of claim 6 wherein said additional circuit means comprises:
    a first adjustable circuit means for linearizing the deflection per increment of current as the horizontal component of said visible curve trace moves away from center of said cathode ray display tube means,
    a second adjustable circuit means for linearizing the deflection per increment of current as the vertical component of said visible curve trace moves away from center of said cathode ray display tube means, and
    a temperature control means for eliminating drift induced by temperature variatioin said first and said second adjustable circuit means.

8. The system of claim 1 wherein said electrical integrating circuit means further comprises:
    a collector-resistor circuit means electrically coupled to zero voltage for preventing the electrical output of said electrical integrating circuit means from crossing through zero voltage.

9. The system of claim 1 further comprising:
    third circuit means electrically coupled in series relation between said diode matrix circuit means and said vertical deflection circuit means for selectively inverting the output wave form of said plural function generating means.

10. The system of claim 1 wherein said display means including said visible curve trace and said experimental curve plot further comprises:
    optical means for superimposing said visible curve trace and said experimental curve plot.

11. The system of claim 1 wherein said display means further comprises:
    semi-transparent mirror means for optically superimposing said visible curve trace and said experimental curve plot.

12. The system of claim 1 additionally comprising:
    an integrating means for determining the relative area of each distribution function constituting the overlapping peak envelope.

13. The system of claim 1 additionally comprising:
a curve plotting means for recording graphically said visible curve trace, including both the individual distribution function and the overlapping peak envelope.

14. The system of claim 1 additionally comprising:
plural tandem channel means for producing and proportionally adjusting a summation of a plurality of individual distribution functions, each of said tandem channel means having an input electrically coupled to said second output circuit of said first circuit means and an output electrically coupled to said vertical deflection circuit means of said cathode ray display tube means.

15. A system for the resolution of distribution function summations comprising:
a first circuit means, having first and second output circuits, for producing a linear ramp signal,
a display tube circuit means having a horizontal deflection input circuit and a vertical deflection input circuit for converting a horizontal input signal and a vertical input signal to a visible curve trace, said horizontal deflection circuit electrically coupled through an adjustable resistance means, incorporated to vary the width of said linear ramp signal, to said first output circuit of said first circuit means,
a square wave generating circuit means having an input circuit and an output circuit for producing a square wave signal in said output circuit, said input circuit electrically coupled to said second output circuit of said first circuit means,
a triangular wave generating means having an output circuit and an input circuit for converting said square wave signal to a symmetrical triangular wave signal, said input of said triangular wave generating means electrically coupled through an adjustable resistance means, for varying the width of said square wave signal, to said output circuit of said square wave generating means,
a diode matrix circuit means having an input circuit and an output circuit for adjustably varying the slope of said symmetrical triangular wave signal in predetermined increments forming a modified wave signal, said input circuit electrically coupled to said output of said triangular wave generating means,
a second circuit means for controlling the height of said modified wave signal having input and output circuits, said input circuit electrically coupled to said output circuit of said diode matrix circuit means,
an additional circuit means for controlling the vertical position of said modified wave signal electrically coupled at a summing point to said output circuit of said height control, and
a circuit means for electrically coupling said summing point to said vertical deflection input circuit of said display tube circuit means.

16. A system for the resolution of distribution function summations comprising:
a first circuit means, having first and second output circuits, for producing a linear ramp signal,
a display tube circuit means, having a horizontal deflection input circuit and a vertical deflection input circuit, for converting a horizontal input signal and a vertical input signal to a visible curve trace, said horizontal deflection circuit electrically coupled through an adjustable resistance means, incorporated to vary the width of said linear ramp signal, to said first output circuit of said first circuit means,
a square wave generating circuit means having an input circuit and an output circuit for producing a square wave signal in said output circuit, said input circuit electrically coupled to said second output circuit of said first circuit means,
a triangular wave generating means having an output circuit and an input circuit for converting said square wave signal to a symmetrical triangular wave signal, said input of said triangular wave generating means electrically coupled through an adjustable resistance means, for varying the width of said square wave signal, to said output circuit of said square wave generating means,
a diode matrix circuit means having an input circuit and an output circuit for adjustably varying the slope of said symmetrical triangular wave signal in predetermined increments forming a modified wave signal, said input circuit electrically coupled to said output of said triangular wave generating means,
a second circuit means for controlling the height of said modified wave signal having input and output circuits, said input circuit electrically coupled to said output circuit of said diode matrix circuit means,
an R.C. circuit means electrically coupled at a first summing point to said output circuit of said height control for introducing a time constant lag to said modified wave signal,
an additional circuit means for controlling the vertical position of said modified wave signal electrically coupled at a second summing point to said R.C. circuit means, and
a circuit means for electrically coupling said vertical deflection input cricuit of said display tube circuit means to said second summing point.

17. A system including power input circuitry for producing a visible curve trace having a preselected baseline and curve shape, and matching said visible curve trace with an experimental curve plot comprising:
a first circuit means having a synchronizing input circuit means and first and second output circuits, said synchronizing input circuit means adapted to produce a ramp signal synchronized with line power input in each of said first and second output circuits,
a display means including a cathode ray display tube means having horizontal and vertical deflection circuit means for converting electrical input signals into a visible curve trace, said horizontal deflection circuit means electrically coupled to said first output circuit of said first circuit means,
a second circuit means, having input and output circuits, for electrically bending the baseline of said visible curve trace at preselected intervals, said input circuit of said second circuit means electrically coupled to said second output circuit of said first circuit means, said output circuit of said second circuit means electrically coupled to said vertical deflection circuit means of said cathode ray display tube means,
plural function generating means each having a square wave generating circuit means, an electrical integrating circuit means electrically coupled to said square wave generating circuit means, said electrical integrating circuit means producing a triangular wave signal, a diode matrix circuit means electrically coupled to said electrical integrating circuit means for adjustably varying the slope of said triangular wave signal at predetermined breakpoints along said triangular wave signal, said plural function generating means each having an input circuit electrically coupled between said second output of said first circuit means and said square wave generating means, and an output circuit means electrically coupled between said diode matrix circuit means and said vertical deflection circuit means of said cathode ray display tube means.

18. A system including power input circuitry for producing a visible curve trace having a preselected baseline and curve shape, and matching said visible curve trace with an experimental curve plot comprising:
a first circuit means having a synchronizing input circuit means and first and second output circuits, said synchronizing input circuit means adapted to produce ramp signal synchronized with line power input in each of said first and second output circuits, a display means including a cathode ray display tube means having horizontal and vertical deflection circuit means for converting electrical input signals into a visible curve trace, said horizontal deflection circuit means electrically coupled to said first output circuit of said first circuit means, plural function generating means each having square wave generating circuit means, an electrical integrating circuit means electrically coupled to said square wave generating circuit means, said electrical integrating circuit means producing a triangular wave signal, a diode matrix means electrically coupled to said electrical integrating circuit means for first adjustably varying the slope of said triangular wave signal at predetermined breakpoints along said triangular wave signal and secondly for electrically creating additional breakpoints intermediate to said predetermined breakpoints and causing the adjustable slope variation to be divided into a plurality of increments, said plural function generating means each having an input circuit electrically coupled between said second output of said first circuit means and said square wave generating circuit means and an output circuit means electrically coupled between said diode matrix circuit means and said vertical deflection circuit means of said cathode ray display tube means.

19. A system including power input circuitry for producing a visible curve trace having a preselected baseline and curve shape, and matching said visible curve trace with an experimental curve plot comprising:

a first circuit means having a synchronizing input circuit means and first and second output circuits, said synchronizing input circuit means adapted to produce a ramp signal synchronized with line power input in each of said first and second input circuits, a display means including a cathode ray display tube means having horizontal and vertical deflection circuit means for converting electrical input signals into a visible curve trace, said horizontal deflection circuit means electrically coupled to said first output circuit of said first circuit means, plural function generating means each having a square wave generating circuit, an electrical integrating circuit means electrically coupled to said square wave generating circuit means, said electrical integrating circuit means producing a triangular wave signal, a diode matrix circuit means including a plurality of adjustable voltage dividing circuits having a common input circuit and two common output circuits, said input circuit electrically coupled to the output of said electrical integrating circuit means, the center of one of said plurality of adjustable voltage dividing circuits electrically coupled to ground and the centers of the other said plurality of adjustable voltage dividing circuits electrically coupled to adjustably biased diode circuits, a first inverting amplifier circuit having input and output circuits, and a second inverting amplifier circuit having input and output circuits, said first and second inverting amplifier circuits electrically coupled in series relationship, between the output of said first inverting amplifier circuit and the input of said second inverting amplifier circuit, one of the said two common output circuits of said plurality of voltage dividing circuits electrically coupled to said input of said first inverting amplifier circuit, the other of said two common output circuits of said adjustable voltage dividing means electrically coupled to a summing point between said first and said second inverting amplifiers, said plural function generating means each having an input circuit electrically coupled between said second output of said first circuit means and said square wave generating circuit means, and an output circuit means electrically coupled between said second inverting amplifier circuit and said vertical deflection circuit means of said cathode ray display tube means.

20. A system including power input circuitry for producing a visible curve trace having a preselected baseline and curve shape and matching said visible curve trace with an experimental curve plot comprising:

a first circuit means having a synchronizing input circuit means and first and second output circuits, said synchronizing input circuit means adapted to produce a ramp signal synchronized with line power input in each of said first and second output circuits, a display means including a cathode ray display tube means having horizontal and vertical deflection circuit means for converting electrical input signals into a visible curve trace, said horizontal deflection circuit means electrically coupled to said first output circuit of said first circuit means, plural function generating means each having square wave generating circuit means, an electrical integrating circuit means electrically coupled to said square wave generating circuit means, said electrical integrating circuit means producing a triangular wave signal, a diode matrix circuit means including a plurality of adjustable voltage dividing circuits having a common input circuit and two common output circuits, said input circuit electrically coupled to the output of said electrical integrating circuit means, the center of one of said plurality of adjustable voltage dividing circuits electrically coupled to ground, the centers of the other said plurality of adjustable voltage dividing circuits electrically coupled to adjustably biased diode circuits, an additional diode circuit electrically coupled in parallel relationship to each of said adjustably biased diode circuits, a first inverting amplifier circuit having input and output circuits, and a second inverting amplifier circuit having input and output circuits, said first and second inverting amplifier circuits electrically coupled in series relationship between the output of said first inverting amplifier circuit and the input of said second inverting amplifier circuit, one of the said two common output circuits of said plurality of adjustable voltage dividing circuits electrically coupled to said input of said first inverting amplifier circuit, the other of said two common output circuits of said adjustable voltage dividing circuits electrically coupled to a summing point between said first and said second inverting amplifiers, said plural function generating means each having an input circuit electrically coupled between said second output of said first circuit means, and said square wave generating circuit means, and an output circuit means electrically coupled between said second inverting amplifier circuit and said vertical deflection circuit means of said cathode ray display tube means.

21. A system including power input circuitry for producing a visible curve trace having a preselected baseline and curve shape and matching said visible curve trace with an experimental curve plot comprising:

a first circuit means having a synchronizing input circuit means and first and second output circuits, said synchronizing input circuit means adapted to produce a ramp signal synchronized with line power input in each of said first and second output circuits, a display means including a cathode ray display tube means having horizontal and vertical deflection circuit means for converting electrical input signals into a visible curve trace, said horizontal deflection circuit means electrically coupled to said first output circuit of said first circuit means, additional circuit means for compensating for nonlinearity of said visible curve trace of said cathode ray display tube means operably coupled to said horizontal deflection circuit means and said vertical deflection circuit means of said cathode ray display tube means, plural function generator means each having square wave generating circuit means, an electrical integrating circuit means electrically coupled to said square wave generating circuit means, said electrical integrating circuit means producing a triangular wave signal, a diode matrix circuit means electrically coupled to said electrical integrating circuit means for adjustably varying the slope of said triangular wave signal at predetermined breakpoints along said triangular wave signal, said plural function generating means each having an input circuit electrically coupled between said second output of said first circuit means and said square wave generating means, and an output circuit electrically coupled between said diode matrix circuit means and said vertical deflection circuit means of said cathode ray display tube means.

22. A system including power input circuitry for producing a visible curve trace having a preselected baseline and curve shape, and matching said visible curve trace with an experimental curve plot comprising:

a first circuit means having a synchronizing input circuit means and first and second output circuits, said synchronizing input circuit means adapted to produce a ramp signal synchronized with line power input in each of said first and second output circuits, a display means including a cathode ray display tube means having horizontal and vertical deflection circuit means for converting electrical input signals into a visible curve trace, said horizontal deflection circuit means electrically coupled to said first output circuit of said first circuit means, a first adjustable circuit means for linearizing the deflection per increment of current as the horizontal component of said visible curve trace moves away from center of said display means operably coupled to said horizontal deflection circuit means, second adjustable circuit means for linearizing the deflection per increment of current as the vertical component of said visible curve trace moves away from center of said display means operably coupled to said vertical deflection circuit means, a temperature control means for eliminating drift induced by temperature variation in said first and second adjustable circuit means operably associated with said first and second adjustable circuit means, plural function generating means each having square wave generating circuit means, an electrical integrating circuit means electrically coupled to said square wave generating circuit means, said electrical integrating circuit means producing a triangular wave signal, a diode matrix circuit means electrically coupled to said electrical integrating circuit means for adjustably varying the slope of said triangular wave signal at predetermined breakpoints along said triangular wave signal, said plural function generating means each having an input circuit electrically coupled between said second output of said first circuit means and said square wave generating means and an output circuit means electrically coupled between said diode matrix circuit means and said vertical deflection circuit means of said cathode ray display tube means.

23. A system including power input circuitry for producing a visible curve trace having a preselected baseline and curve shape, and matching said visible curve trace with an experimental curve plot comprising:

a first circuit means having a synchronizing input circuit means and first and second output circuits, said synchronizing input circuit means adapted to produce a ramp signal synchronized with line power input in each of said first and second output circuits, a display means including a cathode ray display tube means having horizontal and vertical deflection circuit means for converting electrical input signals into a visible curve trace, said horizontal deflection circuit means electrically coupled to said first output circuit of said first circuit means, plural function generating means each having square wave generating circuit means, electrical integrating circuit means electrically coupled to said square wave generating circuit means, said electrical integrating circuit means producing a triangular wave signal, a diode matrix circuit means electrically coupled to said integrating circuit means for adjustably varying the slope of said triangular wave signal at predetermined breakpoints along said triangular wave signal, said plural function generating means each having an input circuit electrically coupled between said second output of said first circuit means and said square wave generating means, and an output circuit electrically coupled between said diode matrix circuit means and said vertical deflection circuit means, third circuit means electrically coupled in series relationship between said output circuit of said plural function generating means and said vertical deflection circuit means of said cathode ray display tube means for selectively inverting the output wave form of said plural function generating means.

References Cited

UNITED STATES PATENTS

| | | | |
|---|---|---|---|
| 2,955,762 | 10/1960 | Dietrich | 235—198 X |
| 3,087,674 | 4/1963 | Cunningham et al. | 235—197 |
| 3,297,822 | 1/1967 | Braid | 88—14 X |
| 3,377,544 | 4/1968 | Dickerson | 235—197 X |
| 2,951,417 | 9/1960 | Reeder et al. | 88—29 |
| 3,040,622 | 6/1962 | Reddle et al. | 88—24 |
| 3,054,998 | 9/1962 | Cooper et al. | 343—5 |
| 3,338,131 | 8/1967 | Klein | 88—24 |

MALCOLM A. MORRISON, Primary Examiner

ROBERT W. WEIG, Assistant Examiner

PO-1050
(5/69)

UNITED STATES PATENT OFFICE
CERTIFICATE OF CORRECTION

Patent No. 3,459,932                      Dated August 5, 1969

Inventor(s) Abram D. Huey, III    and    John D. McGhee

It is certified that error appears in the above-identified patent and that said Letters Patent are hereby corrected as shown below:

Column 9, line 41, "variable" should read --visible--.

SIGNED AND
SEALED

OCT 21 1969

(SEAL)
Attest:

Edward M. Fletcher, Jr.
Attesting Officer

WILLIAM E. SCHUYLER, JR.
Commissioner of Patents